United States Patent [19]

Frazee

[11] Patent Number: 4,573,747
[45] Date of Patent: Mar. 4, 1986

[54] APPARATUS FOR ALIGNING A MACHINE TOOL SADDLE

[75] Inventor: Rivan F. Frazee, Mt. Clemens, Mich.
[73] Assignee: The Cross Company, Fraser, Mich.
[21] Appl. No.: 656,319
[22] Filed: Oct. 1, 1984
[51] Int. Cl.$^4$ .............................................. F16C 29/00
[52] U.S. Cl. .................................................. 308/3 A
[58] Field of Search ............. 308/3 R, 3 A, 6 R, 6 C; 29/1 A

[56] References Cited

U.S. PATENT DOCUMENTS

| 2,435,849 | 2/1948 | Schlitters | 308/3 A |
| 2,491,384 | 12/1949 | MacMillin et al. | 308/3 R |
| 3,008,774 | 11/1961 | Morris et al. | 308/3 A |
| 3,236,569 | 2/1966 | Moosmann | 308/6 R |
| 3,673,918 | 7/1972 | Zankl | 308/3 A X |

FOREIGN PATENT DOCUMENTS 2043918 9/1970 Fed. Rep. of Germany ..... 308/3 A

Primary Examiner—Stuart S. Levy
Assistant Examiner—David Werner
Attorney, Agent, or Firm—James O. Skarsten

[57] ABSTRACT

Apparatus for aligning a machine tool saddle for movement along an axis of travel includes a pair of ways rigidly joined to a support structure in parallel relation with the axis of travel, each of the ways being in slideable engagement with a slot formed in the saddle. Each of the ways is provided with a face selectively angled to line on one of the legs of an imaginary "V" positioned so as to be bisected by a plane parallel to the ways and positioned midway between them. A number of keeper blocks are inserted between the saddle and each of the angled way faces to lock the keeper blocks having an angled face in closely spaced parallel relation with one of the angled way faces. Devices are positioned between the angled faces of the keepers and their respective closely spaced angled way faces to transmit forces between the ways and the saddle through the keeper blocks to maintain the saddle in alignment with the axis of travel as the saddle is selectively moved and positioned along the axis. The devices are also adjustable to selectively space the angled faces of the keeper blocks from the angled way faces.

6 Claims, 6 Drawing Figures

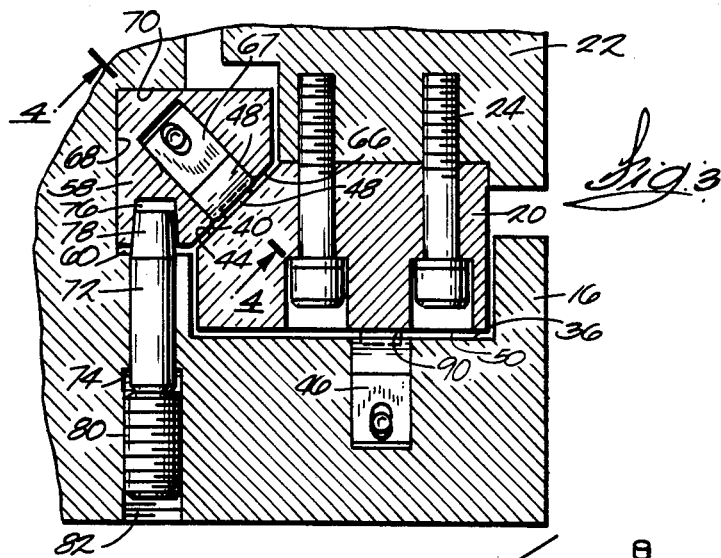
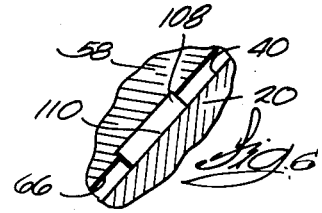
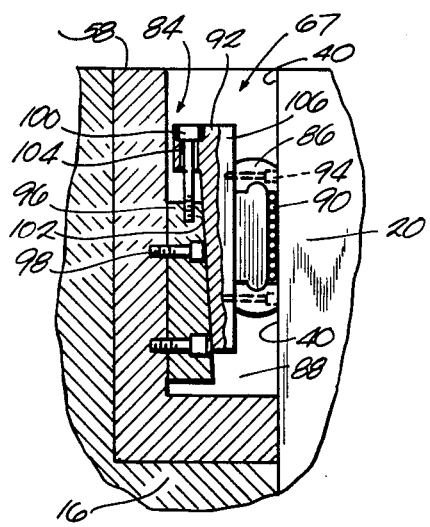
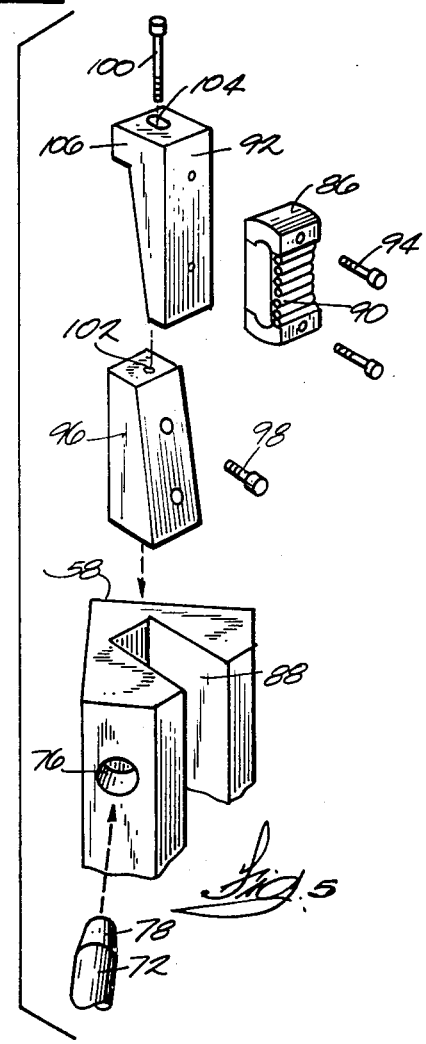

APPARATUS FOR ALIGNING A MACHINE TOOL SADDLE

BACKGROUND OF THE INVENTION

The invention pertains to machine tools wherein a saddle or slide is to be precisely aligned for movement along a set of parallel ways. In one useful application, the invention is used in association with a saddle carrying a spindle and spindle drive which must be moved along a set of ways to machine a workpiece. In order for the machine operation to be accurate, the axis of the spindle must be in strict parallel relation to the ways as a rotary cutter driven by the spindle is brought into engagement with the workpiece.

In a typical arrangement for keeping the axis of a vertical machine tool spindle carried by a saddle in alignment with a set of vertically positioned ways, slots are formed in the saddle to receive the ways in sliding relationship. If the ways are of a type referred to as flat ways, they each have a flat forward surface and orthogonal sides, and the slots have bases and sides which respectively match the flat surface and sides of the ways. Members known as keepers are attached to the saddle and extend behind the ways to prevent transverse movement of the spindle relative to the ways as the saddle moves vertically along the ways. The keepers also prevent the spindle and its associated spindle-head, which project outward from the ways, from rotating downwardly.

In arrangements of the above type, the keepers are generally joined to the saddle by means of bolts or screws which are subjected to, and must take up, both horizontal and vertical loading of the saddle. As a result, keepers are frequently broken loose from the saddle. Also in such arrangements, wear tends to occur between the sides of the slots and the sides of the ways as the saddle moves vertically. It is therefore necessary to place adjustable gibs or like devices between the saddle and the ways to take up way-induced clearance.

SUMMARY OF THE INVENTION

The present invention provides apparatus for aligning and guiding a machine tool slide or saddle for movement along an axis of travel. The apparatus includes a pair of parallel ways mounted to a support structure in parallel relation to the axis of travel, the ways engaging slots formed in the saddle and having faces which are selectively angled to lie in planes that form a "V"-shaped configuration positioned to be bisected by a plane which is parallel to the ways and located midway between them. The apparatus further includes a selected number of keeper blocks, which are each inserted between the saddle and one of the angled way faces. Means selectively positioned relative to each of the keeper blocks transmit forces between the saddle and the ways through the angled way faces and the keeper blocks to maintain the saddle in alignment along the axis of travel as the saddle is selectively moved and positioned along the axis.

In a preferred embodiment of the invention, a machine tool spindle and associated spindle drive are mounted on the saddle, and the saddle is moved along its path of travel to position the spindle for performing a machining operation. The keeper blocks are inserted into block receiving slots formed in the saddle, so as to abut the saddle, and to have angled faces in closely spaced parallel relation with the angled way faces. The means for transmitting forces comprises means positioned between each of the keeper blocks and its adjacent way face for transmitting forces therebetween, and also for adjusting the spacing therebetween. Each keeper block is maintained in its slot by means of a removable retention pin, so that the keeper blocks may be readily placed in initial assembly, and replaced in the event of wear.

An important advantage of the invention lies in preventing detachment of keepers which are joined to a machine tool saddle to align the saddle for movement along a set of ways.

Another advantage is the elimination of need for gibs or the like between the saddle and the ways to take up wear-induced clearance.

Another advantage is a more solid transmission of forces between the saddle and ways to oppose other forces tending to move the saddle out of alignment.

Another advantage lies in a significant reduction in cost associated with mounting a machine tool spindle head for movement along an axis of travel, and particularly along a vertical axis.

These and other advantages will become more readily apparent from the ensuing detailed description of the preferred embodiment, taken together with the drawings.

BRIEF DESCRIPTION OF THE DRAWINGS

FIG. 3 is a view showing a portion of FIG. 1 in greater detail.

FIG. 4 is a sectional view taken along line 4—4 of FIG. 3 to show a linear way bearing wedge pack for the embodiment shown in FIGS. 1–3.

FIG. 5 is an exploded perspective view of the bearing wedge pack shown in FIGS. 1–4.

FIG. 6 is an alternate embodiment of the invention.

DETAILED DESCRIPTION OF THE PREFERRED EMBODIMENT

Figure 1:
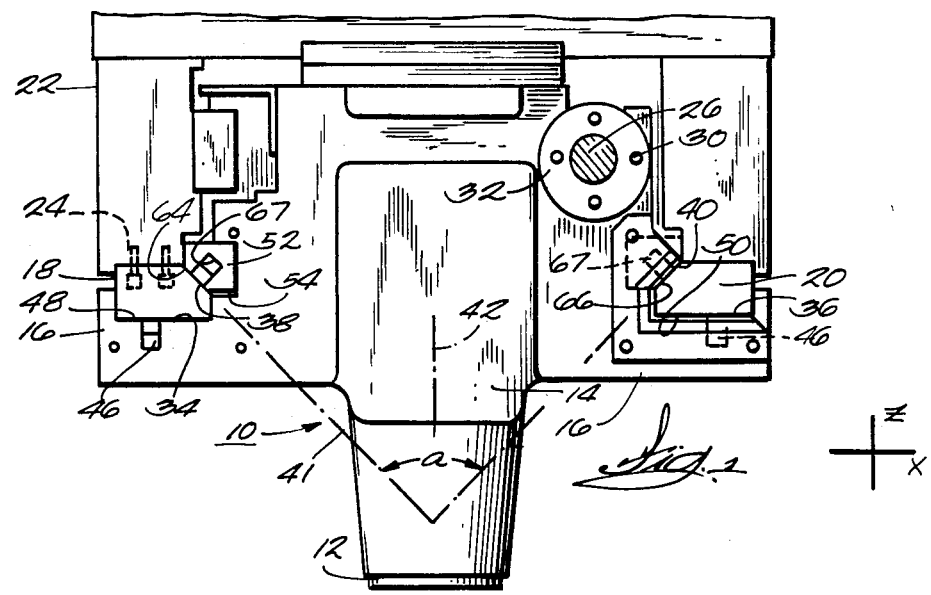
FIG. 1 is a top plan view showing an embodiment of the invention as employed in a machine tool to align a saddle for movement relative to a vertical column.

Referring to FIG. 1, there is shown a machining unit 10 of conventional design which includes a horizontally oriented spindle 12 and housing 14, a gear drive (not shown) and a motor (not shown) being contained in housing 14. Selected metal cutting tools (not shown) are insertable into spindle 12, and spindle 12 receives power from the motor through the gear drive to rotatably drive an inserted tool against a metal part (not shown). Thus, machining unit 10 operates to machine a part, after spindle 12 and an inserted tool have been selectively positioned relative to the part.

FIG. 1 further shows X and Z axes, which are orthogonal to one another and oriented in a horizontal plane. The axis of spindle 12 must be maintained in parallel relation with the Z axis to perform accurate machining operations.

To position spindle 12 vertically, machining unit 10 is mounted on a saddle 16 which is constrained to move along ways 18 and 20, rigidly joined to a supporting column 22 in parallel relation with a vertical axis, such as by means of bolts 24. A feed screw 26 oriented in parallel relation with the vertical axis engages a running nut 28 (shown in FIG. 2) which is attached to saddle 16, such as by means of screws or bolts 30 which pass through a flange 32 of nut 26. Thus, by selective rotation of feed screw 26 by any conventional means (not shown), saddle 16 and machining unit 10 are moved upwardly or downwardly to position spindle 12 for a machining operation. As is well known in the machine tool industry, and as shown in FIG. 2, the vertical axis of spindle movement is typically referred to as the Y-axis.

Referring further to FIG. 1, there are shown ways 18 and 20 in sliding engagement with slots 34 and 36, respectively, which are formed in saddle 16. Ways 18 and 20 are provided with angled way faces 38 and 40 which respectively lie in planes forming a "V" configuration 41, positioned so as to be bisected by a plane 42 which is in parallel relation with ways 18 and 20, and located midway between them. Usefully, the angle a of "V" configuration 41 is selected from the range 30° to 60°. Spacing devices 46, described hereinafter, are positioned between faces 48 and 50 of ways 18 and 20, respectively, and saddle 16.

Figure 2:
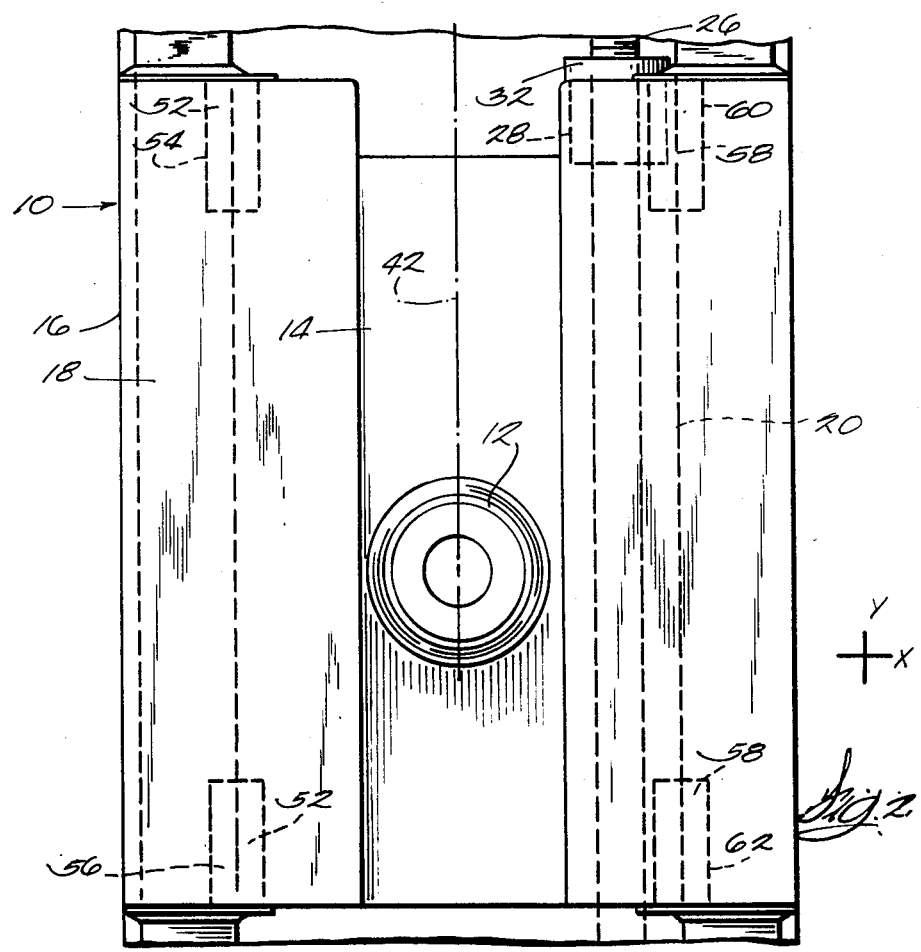
FIG. 2 is a front elevational view showing the saddle of FIG. 1.

FIG. 1 and FIG. 2 show different views of keeper blocks 52 inserted into slots 54 and 56, formed in saddle 16, and further show keeper blocks 58 inserted into slots 60 and 62 formed therein. An angled face 64 of each block 52 is thus positioned in closely spaced parallel relation with angled way face 38 of way 18, and an angled face 66 of each block 58 is positioned in closely spaced parallel relation with angled way face 40 of way 20. Spacing devices 67, which may be identical to devices 46, are positioned between keeper blocks 52 and angled way face 38, and between keeper blocks 58 and angled way face 40.

Referring to FIG. 3, there is shown the keeper block 58 inserted into slot 60 provided with faces 68 and 70 which are, respectively, positioned to abut the base and one of the sides of slot 60. Face 68 is in parallel relation with the Z-axis, and face 70 is in parallel relation with the X-axis. The keeper block 58 is held in place in slot 60 by means of a retention pin 72 which is inserted through a hole 74 formed through saddle 16. A tapered hole 76 is formed in the keeper block on a side thereof which is opposite to its face 70, hole 76 being tapered to receive a tapered end 78 of pin 72. Thus, when end 78 is urged into hole 76, faces 68 and 70 of the keeper block are urged tightly against saddle 16. Pin 72 is urged toward the keeper block by rotation of a threaded plug 80 which abuts the rearward end of pin 72 and is provided with threads engaging threads 82 formed in the outer portion of hole 74. It is to be understood that the other keeper block 58 and keeper blocks 52 are of the same construction as the keeper 58 block shown in FIG. 3. All of the keeper blocks interact between saddle 16 and ways 18 and 20 as hereinafter described.

Referring to FIGS. 4 and 5, there is shown a spacing device 67, comprising a wedge pack 84 and a linear bearing 86, positioned in a slot 88 formed in the keeper block 58 inserted into slot 60. Linear bearing 86 is provided with roller elements 90, which engage angled way face 40 for movement therealong, and may comprise any one of a number of such devices occurring to those of skill in the art. Bearing 86 is joined to movable wedge member 92 of wedge pack 84, such as by bolts 94. Wedge pack 84 further comprises a fixed wedge member 96, joined to keeper block 58 by means of bolts 98, and an adjustment screw 100. Screw 100 engages both threads formed in a hole 102 in member 96, and threads formed in a hole 104 which traverses a flange 106 of member 92. Holes 102 and 104 are aligned coaxially, so that rotation of screw 100 results in displacement of movable wedge member 92, upwardly or downwardly as viewed in FIG. 4, relative to fixed wedge member 96. The tapered surfaces of wedge members 92 and 96 are in abutting relationship whereby downward movement of member 96 causes a wedging action which urges bearing 86 against angled way face 40. By moving wedge member 92 downward sufficiently, spacing device 67 becomes firmly positioned between keeper block 58 and angled way face 40, and serves to solidly transmit forces therebetween. In like manner, each of the other spacing devices 67 is firmly positioned between one of the angled way faces and a keeper block.

If a force acting on saddle 16 of machining unit 10 tends to deflect the axis of spindle 12 from its true position, as required for accurate machining of a part, the arrangement of keeper blocks 52 and 58, angled way faces 38 and 40 and devices 67 interact to transmit substantially equal opposing forces solidly into saddle 16. Thus, spindle 12 is maintained in its proper alignment. For example, if an X-component of a deflecting force urges saddle 16 to the right, as viewed in FIG. 1, way 20 generates an equal counterforce which is transmitted to keeper blocks 58 through angled way face 40, devices 67, and keeper blocks 58, and across faces 68 of keeper blocks 58 into saddle 16 to urge the saddle leftward. A component of a deflecting force lying along the Z-axis is similarly opposed, by an equal counter-force transmitted into saddle 16 through keeper blocks 52 and 58 and across keeper block faces 70. A force tending to rotate the saddle downwardly is opposed by a force transmitted into saddle 16 through keeper blocks 52 and 58 inserted in slots 56 and 62, respectively.

It is clear from FIGS. 1 and 2 that saddle 16 is locked in sliding relationship with ways 18 and 20 by means of keeper blocks 52 and 58, inserted into their respective slots in saddle 16 as aforestated. It will be readily apparent that the process of inserting the keeper blocks into their respective slots, and then securing them with retention pins 72, is comparatively simple. It is anticipated that important savings will thereby be realized in the cost of assembling machining apparatus as shown in FIGS. 1 and 2.

Many other modifications and variations of the invention are possible, such as the modification shown in FIG. 6. In FIG. 6, a spacer 108 of selected width is inserted between a keeper block 58 and its spaced apart angled way face to serve as a spacing device 67. Use of spacers 108 as spacing devices 67 eliminates the need for bearings 86 and wedge packs 84, as well as the need to form slots 88 in the keeper blocks. FIG. 6 shows spacers 108 having a surface 110 in sliding engagement with angled way face 40.

What is claimed is:

1. Apparatus for aligning a machine tool saddle (16) for movement along an axis of travel, said apparatus comprising:

a pair of parallel ways (18, 20) mounted to a support structure (22) in parallel relation with said axis of travel, said ways (18, 20) having faces (38, 40) which are selectively angled to lie in planes which form a "V"-shaped configuration (41) positioned to be bisected by a plane (42) located midway between said ways (18, 20), said ways being formed to slidably engage slots (34, 36) formed in said saddle (16) having bases which are parallel to a first axis and sides which are parallel to a second axis, said first and second axes being orthogonal to each other and to said axis of travel, said ways having surfaces in opposing relationship with said bases and said sides of said slots (34, 36), said angled way faces (38, 40) lying outside of said slots and at acute angles to said first and second axes;

a number of keeper blocks (52, 58), each of said keeper blocks having an angled keeper face (66) in opposing parallel relation with one of said way faces (38, 40) and first (68) and second (70) faces abutting said saddle, each of said first faces (68) being parallel to said first axis and each of said second faces (70) being parallel to said second axis; and means (67) positioned relative to said keeper blocks (52, 58) for solidly transmitting forces between said ways (18, 20) and said saddle (16) through said angled way faces (38, 40) and said angled keeper faces (66) to maintain said saddle (16) in alignment along said axis of travel as said saddle (16) is selectively moved and positioned along said axis of travel.

2. The apparatus of claim 1 wherein:

said force transmitting means (67) comprises a number of linear bearings (86) in sliding contact with said angled way faces (38, 40), and means (84) associated with said linear bearings for acting against said angled keeper faces (66) to hold said linear bearings (86) firmly against said angled way forces (38, 40).

3. The apparatus of claim 2 wherein:

each of said means (84) for acting against said angled keeper faces (66) comprises a wedge pack (84) having an adjustment screw (100) and responsive to rotation of said adjustment screw (100) to selectively urge an associated linear bearing (86) toward or away from one of said angled way faces (38, 40).

4. The apparatus of claim 1 wherein:

said means for transmitting forces comprise spacers (108) of selected width positioned between said angled keeper faces (66) and the angled way faces (38, 40) respectively opposing said angled keeper faces (66).

5. The apparatus of claim 1 wherein:

said apparatus includes means (72) for removably holding said keeper blocks in position between said saddle (16) and said angled way faces (38, 40).

6. The apparatus of claim 5 wherein:

said ways (18, 20) are oriented to guide a saddle (16) carrying a spindle head (14) along a vertically oriented axis of travel; and said holding means (72) comprise removable retention pins (72) for holding said keeper blocks to said saddle (16) for movement therewith along said vertically oriented axis of travel.

* * * * *